United States Patent [19]

Grosvenor et al.

[11] 4,422,561
[45] Dec. 27, 1983

[54] FUEL TANK COMPONENT

[75] Inventors: Ronald L. Grosvenor, Wolverhampton; Michael Fox, Wheaton Aston, both of England

[73] Assignee: IMI Marston Limited, Wolverhampton, England

[21] Appl. No.: 264,692

[22] Filed: May 18, 1981

[51] Int. Cl.³ .............................................. B65D 25/16
[52] U.S. Cl. .................................... 220/461; 220/900; 244/135 R; 428/912
[58] Field of Search ....................... 220/453, 461, 900; 428/911, 912; 109/80; 244/135 R, 135 B

[56] References Cited

U.S. PATENT DOCUMENTS

| 1,282,411 | 10/1918 | Golembiowski | 428/911 X |
| 1,436,985 | 11/1922 | Friant | 220/900 X |
| 3,379,336 | 4/1968 | Stedfeld | 220/900 X |
| 3,509,016 | 4/1970 | Underwood et al. | 220/900 X |
| 4,088,240 | 5/1978 | San Mishel | 220/452 |

Primary Examiner—Allan N. Shoap
Attorney, Agent, or Firm—Cushman, Darby & Cushman

[57] ABSTRACT

An inner wall for a self-sealing fuel tank in which the inner wall is provided with a plurality of fronds bonded at one end to the wall, the fronds facing towards the inside of the tank such that on penetration of the wall of the tank by a projectile the fronds are carried by the surge of escaping fuel through the wall to become entangled in the hole and choke off escaping fuel.

7 Claims, 6 Drawing Figures

FUEL TANK COMPONENT

BACKGROUND OF THE INVENTION

This invention relates to fuel tank components and has particular reference to walls for use in self-sealing fuel tanks.

It is well-known to provide self-sealing fuel tanks for military aircraft. By virtue of their nature military aircraft are subject to penetration of projectiles such as bullets and shrapnel from exploding missiles etc. The use of a self-sealing fuel tank helps the aircraft survive in two ways. Firstly, it chokes off the escape of fuel from the fuel tank which might cause fires in the aircraft and thus destroy it. Secondly, the conventional military aricraft by virtue of the large weight of stores it has to carry has problems in providing sufficient fuel capacity. Thus, when working at long ranges the aircraft will normally only have sufficient fuel just to get back to base. If this, however, is lost as a result of enemy action the aircraft will have to be abandoned even though it is flyable. Thus, retaining the fuel in the tank by means of self-sealing tanks enables the aircraft to return to base and thus be repaired and re-used. The second feature is probably of greater importance than the first feature.

Conventional self-sealing fuel tanks have a layer of material, normally on the outside of the tank, which swells up to choke off fuel escaping from the tank. The layer may be of a type which is swellable when in contact with the fuel or may be activated by the heat of a projectile passing through it. It has been found that small diameter projectiles which leave small diameter holes can be dealt with quite adequately by swellable sealing means of this type.

However, recent advances in military technology have resulted in the use of larger diameter projectiles which can give rise to larger diameter holes. The escaping fuel through these holes has been found to pass through the hole with a sufficient velocity to wash out the expanding sealant so that the hole is never fully sealed.

In U.S. Pat. No. 4,088,240 there is described a wall for use in self-sealing tanks which is intended to help reduce problems of this type. Basically, the wall comprises a mat of thin elongate fibres arranged on the inside of the fuel tank. Once the projectile has passed through the wall the surge of escaping fuel carries with its strands of the mat adjacent the hole so as to restrict the flow of fuel through the hole.

The present invention is concerned with devices of this general type but which have improved choking characteristics compared to the prior art described in U.S. Pat. No. 4,088,240 and which may be easily and cheaply manufactured.

SUMMARY OF THE INVENTION

By the present invention there is provided a tangling wall for the inside of a fuel tank comprising a support layer having attached thereto strips of material, some at least of the strips having a spine and extending therefrom a plurality of strands having free ends remote from the spine.

The spines are preferably disposed in parallel rows. The strands of one spine preferably overlap the spine of the next adjacent row. The spine and strands are preferably integrally formed from a single strip of material. The spines are preferably bonded to the support layer. The spines are preferably welded to the support layer. Preferably the spine and strands are formed from the same materials as the support layer. The material may be polyurethane. The strands are preferably in the form of flat elongate fronds. Preferably the edges of the fronds are not straight. The thickness of the fronds is preferably sufficient to make them self-supporting when held vertically upright.

The present invention further provides a fuel tank incorporating a tangling wall of the type herein disclosed. The strips are preferably disposed horizontally along the upright portions of the wall.

BRIEF DESCRIPTION OF THE DRAWINGS

By way of example embodiments of the present invention will now be described with reference to the accompanying drawings, of which.

DESCRIPTION OF THE PREFERRED EMBODIMENTS

Figure 1:
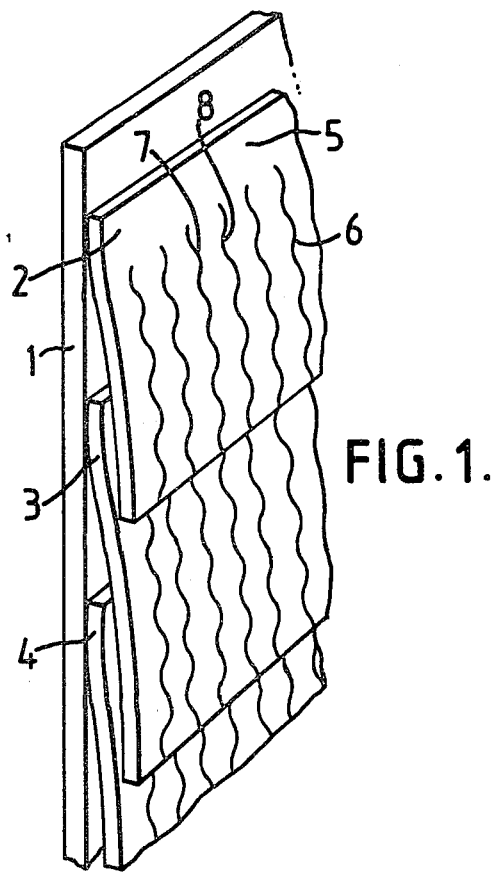
FIG. 1 is a perspective view of a tangling wall in accordance with the present invention.
Figure 2:
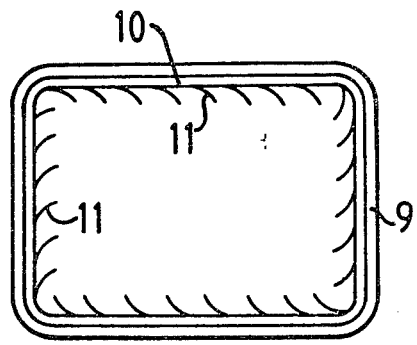
FIG. 2 is a cross-section of a tank incorporating walls of the present invention.

Referring to FIG. 1 this shows a tangling wall comprising a support layer 1 formed of a polyurethane sheet having bonded thereto strips 2, 3 and 4 of polyurethane. Each strip comprises a spine such as 5 together with a series of fronds 6 which are formed integrally with the spine. The spines such as 5 are welded directly to the support layer 1. The fronds 6 are formed by cutting into the strips along a plurality of lines such as 7, 8. The tangling wall is located in a fuel tank as is shown in FIG. 2.

The outer wall of the fuel tank 9 contains a suitable swelling sealing medium of known type. The inner wall comprises a support layer 1 as shown in FIG. 1. The strips of material are indicated schematically as at 11.

Figure 3:
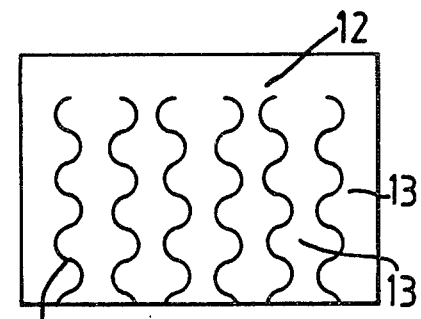
FIG. 3 is a side elevational view of one portion of a tangling wall.
Figure 3A:
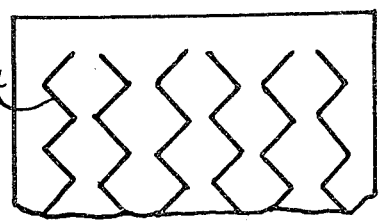
FIG. 3A is a view similar to FIG. 3 illustrating fronds of a different shape.

Referring to FIG. 3 it can be seen that the strips each comprise a spine 12 integrally formed with fronds 13 which are produced by cutting the strip along sinusoidal lines 14. In FIG. 3A the corresponding cut lines are zig-zag, as shown at 14a.

Figure 5:
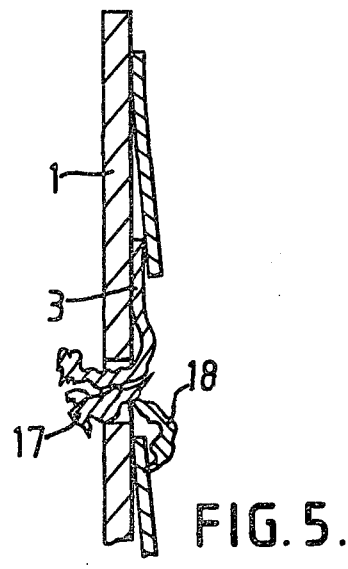
FIG. 5 is a side elevational view of the wall of FIG. 4 after penetration.
Figure 4:
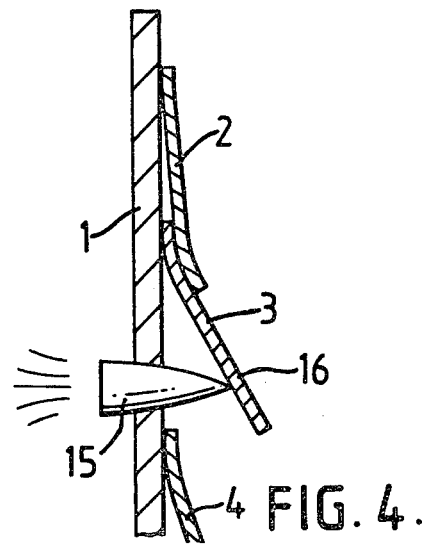
FIG. 4 is a side elevational view of a wall being penetrated by a projectile.

As shown in FIG. 4 the fronds to each strip overlap slightly so that when a projectile 15 passes through the support layer 1 it displaces the fronds such as frond 16. Because polyurethane is sufficiently tough it has been found that the frond is not destroyed by the projectile passing through the wall. Once the projectile has passed through the wall fuel immediately attempts to escape through the hole thus formed in a surge which carries through the fronds so that they become entangled in the hole as is shown in FIG. 5.

It can be clearly seen from FIG. 5 that the fronds such as 17 from the layer 3 have become entangled with fronds such as 18 from the layer below. Because of the roughness of the fronds resulting from the zig-zag or sinusoidal cuts used to make the fronds the fronds become trapped in the hole. It has been found that following the initial surge of fuel out of the tank there is a negative pressure developed in the tank (which is often formed of a flexible material in any case) such that there is an attempt to suck back the fronds from the hole in the tank. With thin fibres it is believed that the fibres are simply swept back into the tank, thus undoing the good they have formed by entering the hole in the first place. With the thicker fronds provided by the strips of the present invention, however, particularly when the fronds have rough edges, the fronds stay in the hole to choke off the fuel supply and to restrict it to a sufficiently significant amount such that conventional self-sealing compounds are able to completely seal the tank.

We claim:

1. In a fuel tank adapted to self-seal in the event of penetration, a tangling wall formed of a plurality of strips of material secured to the interior of the tank wall, some of the strips being cut so as to provide a plurality of strands having one end joined to a spine of the strip transverse to the strands and having free ends remote from the spine, the strands being in the form of flat elongate fronds having edges which include back and forth bends presenting peaks and valleys, the spines being disposed in parallel rows with the strands of one spine overlapping the spine of the next adjacent row.

2. A fuel tank as in claim 1 wherein the strips are formed of polyurethane.

3. A fuel tank as in claim 1 wherein the strips are formed of polyurethane of a thickness such that the fronds are self-supporting when held vertically upright.

4. A fuel tank as in claim 3 wherein the strips are disposed horizontally along upright portions of the wall.

5. In a fuel tank adapted to self-seal in the event of penetration, a tangling wall formed of a plurality of strips of material secured to the interior of the wall, the strips being cut so as to provide a plurality of strands having one end joined to a spine of the strip transverse to the strands and having free ends remote from the spine, the strands being in the form of flat elongate fronds having edges which include back and forth bends presenting peaks and valleys, the spines being disposed in parallel rows with the strands of one spine overlapping the spine of the next adjacent row, the peaks and valleys of the edges of the strands mating with the valleys and peaks of adjacent strands.

6. A fuel tank as in claim 5 wherein said edges are sinusoidal.

7. A fuel tank as in claim 5 wherein said edges are zig-zag.

* * * * *